J. S. HOLLIDAY.
SYSTEM FOR THE TRANSMISSION AND DISTRIBUTION OF ELECTRICAL ENERGY.
APPLICATION FILED DEC. 18, 1914.

1,272,444.

Patented July 16, 1918.

WITNESSES

INVENTOR
John S. Holliday

UNITED STATES PATENT OFFICE.

JOHN S. HOLLIDAY, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

SYSTEM FOR THE TRANSMISSION AND DISTRIBUTION OF ELECTRICAL ENERGY.

1,272,444.    Specification of Letters Patent.    Patented July 16, 1918.

Application filed December 18, 1914.  Serial No. 877,882.

*To all whom it may concern:*

Be it known that I, JOHN S. HOLLIDAY, a citizen of the United States, residing at Wilkinsburg, in the county of Allegheny and State of Pennsylvania, have invented certain new and useful Improvements in Systems for the Transmission and Distribution of Electrical Energy, of which the following is a specification.

My invention relates to systems for the transmission and distrubution of electrical energy, and more particularly to sectionalized transmission lines. When, after an interruption of service, power is to be reapplied to a transmission line, it may be that the power necessary to start the operation of the entire system is much greater than the ordinary full load power required for the system. For example, in a railway signaling system, in which relays and signals are supplied by a transmission line, the power necessary to clear all signals at once may be three or four times the normal operating power of the system. This is due to the fact that much more power is required to clear a signal than to hold the signal at the clear indication. Thus a considerable increase in the size of the generating apparatus above that required for normal operation is necessary.

In my invention, however, the transmission line is divided into sections. When the line is to be energized, power is first applied to one section only, and after an interval of time sufficient to permit the apparatus associated with that section to assume such condition that it consumes only the normal power, power is applied to another section, and so on. Thus the entire transmission line may be gradually energized in such manner that the starting power is not much greater than the normal load.

I will describe one form of apparatus embodying my invention, and will then point out the novel features thereof in claims.

Figure 1:
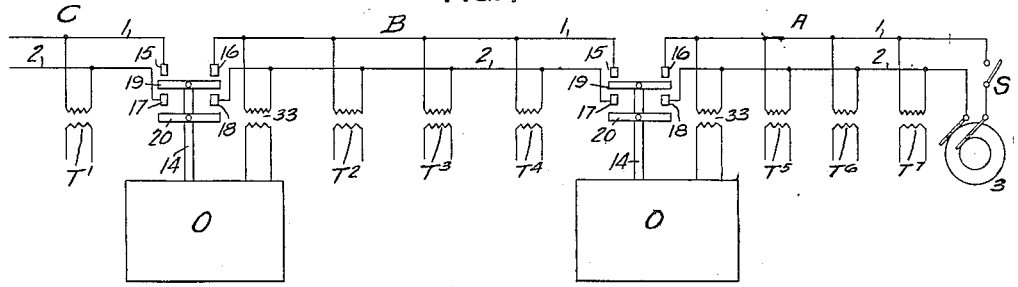
Figure 2:
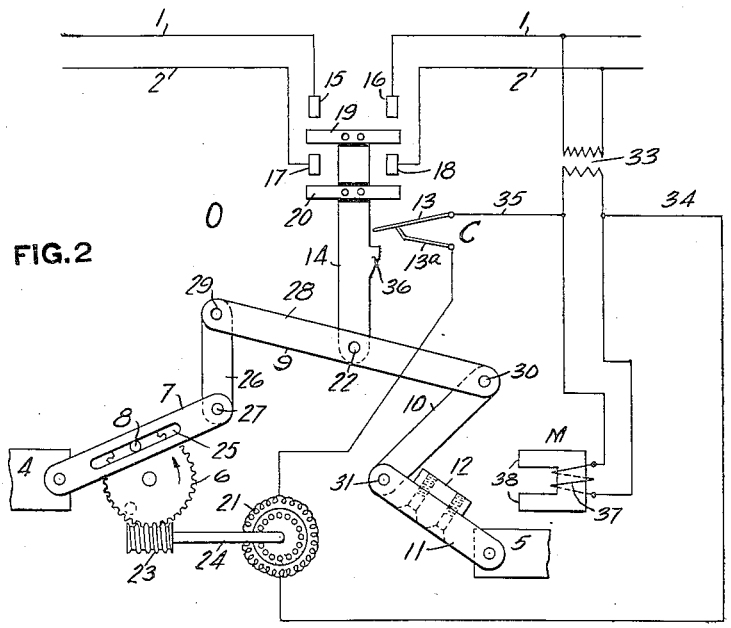

In the accompanying drawings, Figure 1 is a diagrammatic view showing a transmission line having applied thereto one form of apparatus embodying my invention. Fig. 2 is a view showing one of the switches O shown in Fig. 1.

Similar reference characters refer to similar parts in both of the views.

Referring first to Fig. 1, I have here shown a transmission line comprising two wires 1, 2, which line is divided into sections A, B, etc. The several sections may be connected with and disconnected from each other by switches O, O, etc., one such switch being located between each two adjacent sections. Current is supplied to the transmission line by means of a generator 3, here shown to be a single phase alternator. Transformers $T^1$, $T^2$, $T^3$, etc., supply power from the line 1, 2 to electrical loads of any description such as signals, lamps, etc.

Referring now to Fig. 2 the switch O comprises fixed contacts 15, 16 and 17, 18 which are bridged by bars 19 and 20 respectively when the switch is in the closed position, these contacts and bridging bars constituting a circuit controller for connecting the adjacent sections of the transmission line. Bars 19 and 20 are rigidly attached to, and electrically insulated from, a sliding link 14. The link 14 is movable in a vertical direction by means of a motor 21 through a system of gearing and links which I will now describe. A worm gear 23, rigidly attached to the motor shaft 24, meshes with a worm wheel 6. A pin 8, inserted in the worm wheel 6, is adapted to slide in a slot 25 in a link 7 pivoted at one end to a fixed member 4. The other end of this link 7 is connected to another link 26 by a pin 27. Link 26 is pivotally connected with one end of a link 28 by a pin 29. The other end of link 28 is connected by pin 30 to a toggle device consisting of links 10 and 11, pin connected at 31. The other end of link 11 is pivoted to a fixed member 5. The sliding link 14 is connected by a pin 22 to link 28.

A transformer 33, the primary of which is connected to the transmission line on that side of the sectionalizing point nearer to the generator 3, furnishes power for the motor 21 through leads 34 and 35 and a contact C. Contact C comprises two fingers 13 and 13ª which are normally in contact, but which are opened by a shoulder 36 on link 14 when this link is raised to such position that the switch contacts are closed.

Transformer 33 also supplies power to the energizing winding 37 of magnet M. The armature 12 of this magnet is attached to link 11 at such a point that, when link 11 is swung clockwise about its pivot 5 armature 12 will engage with the pole-faces 38 of magnet M.

In the drawing I have shown all the parts in the positions occupied when there is no current supplied to the transmission line. When voltage is applied to the line by closing switch S, only section A takes power from generator 3, for switches O, O, etc., are open. Transformer 33, the primary of which is connected to section A of the transmission line is energized. Magnet 38 of the first switch O is energized but it cannot move its armature 12, because this armature is too far away from the magnet. Since contact C is closed, motor 21 is energized and begins to revolve the worm wheel 6 in the direction of the arrow. Pin 8, sliding in slot 25 of link 7, causes that link to turn in a clockwise direction about pivot 4. Link 28 is thereby caused to turn about pivot 22 so that point 30 of this link is raised, and the toggle device formed by links 10 and 11 is closed, that is, these links are straightened out. Armature 12 is thus brought against the pole-faces 38 of magnet M, and it is held there because magnet M is energized. When this is accomplished pin 8 will have moved to the dotted position. Further rotation of wheel 6 will cause link 7 to rotate counter-clockwise around pivot 4, and since point 30 is stationary because armature 12 is held by magnet M, the left hand end of link 28 is raised so that link 14 is pushed upward. When link 14 reaches the highest point of its travel it closes the contacts 15, 16 and 17, 18, and opens contact C. Sections A and B of the transmission line are then connected, and the motor 21 is stopped in such a position that pin 8 and link 7 remain in the position shown in Fig. 2. That is, the worm wheel 6 is turned through one complete revolution in order to close the switch O. Section B now being energized, the switch O between sections B and C is set in operation and connects these sections after a predetermined interval of time, and so on until the entire transmission line is energized.

It is evident that the time for one revolution of the worm wheel 6 can be varied by changing the gear ratio of the worm gear. The closing of the various switches O should be so timed that during starting the transmission system carries 100 to 150% of the full load, according to the overload capacity of the generator 3. Thus the load on section A of the line should be such that its starting power is equal to the maximum capacity of the generators. Switch O should be timed so as to close when the starting power required by section A has diminished to normal value or to such an amount that the sum of the starting power for section B and the power required by section A at the time of the closing of switch O is equal to the maximum capacity of the generators. Thus maximum rapidity of energization of the transmission line is secured by properly proportioning the loads on the various sections and the time of closing of the switches.

When switch S is opened, potential is taken off the line. Magnet M of each switch O is then deënergized so that armature 12 is released. Toggle 10, 11 opens and link 14 is pulled downward by gravity, (point 29 being stationary) so that the switch opens. The position of the links is then as shown in Fig. 2, ready to operate again as described above when potential is reapplied to the line.

I do not, in this application, claim the operating mechanism O *per se*, the structure of this mechanism being the subject-matter of the claims in my copending application filed September 1, 1915, Serial No. 48534, which application is a division of the present case.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a sectionalized transmission line, circuit controllers for connecting together adjacent sections of said transmission line, and operating mechanism for each circuit controller for closing the circuit controller after a predetermined interval of time after potential has been applied to a section of the transmission line adjacent to said circuit controller.

2. In combination, a sectionalized transmission line, circuit controllers for connecting together adjacent sections of the said transmission line, mechanism for each circuit controller for closing the circuit controller after a definite interval of time after potential has been applied to a section adjacent to such circuit controller, and a holding device for each circuit controller for holding the circuit controller closed.

3. In combination, a sectionalized transmission line, circuit controllers for connecting adjacent sections of said transmission line, a motor for each circuit controller, mechanism for each circuit controller intermediate the motor and the circuit controller for closing the circuit controller after a definite period of time after the motor is energized, a circuit for energizing the motor until said circuit controller has been closed, and a holding mechanism comprising an electromagnet for holding said circuit controller closed after it has been closed.

4. In combination, a sectionalized transmission line, slow-acting circuit controllers for connecting together adjacent sections of said transmission line, each circuit controller being biased to the open position, and means for each circuit controller for holding the circuit controller in the closed position as long as potential is applied to an adjacent section of the transmission line.

5. In combination, a sectionalized transmission line, slow-acting circuit controllers for connecting together adjacent sections of said transmission line, each circuit controller being biased to the open position, electromagnets for holding said circuit controllers in the closed position, energizing circuits for said electromagnets, and means for energizing said circuits as long as potential is applied to the transmission line.

6. In combination, a transmission line divided into sections, circuit controllers for connecting together adjacent sections of said transmission line, operating mechanism for each circuit controller for closing the circuit controller after a definite interval of time after the mechanism has been set into operation, said mechanism being biased to such position that the circuit controller is open, an electromagnet for each circuit controller for holding said operating mechanism against its bias, and an energizing circuit for each electromagnet supplied with current from that adjacent section of the transmission line which is nearer to the generating station.

7. In combination, a sectionalized transmission line, circuit controllers for connecting adjacent sections of said transmission line, a motor for each circuit controller, mechanism for each circuit controller intermediate the motor and the circuit controller for closing the circuit controller after a definite period of time after the motor is energized, a circuit for energizing each motor, said circuit being energized from the adjacent section of the transmission line nearer to the generating station, a normally closed contact included in the motor circuit, and means controlled by the circuit controller operating mechanism for opening said contact when the closing movement of the circuit controller is complete.

8. In combination, a sectionalized transmission line, circuit controllers for connecting adjacent sections of said transmission line, a motor for each circuit controller for closing the circuit controller after a definite period of time after the motor is energized, a circuit for each motor energized from the transmission line, and means controlled by each circuit controller for opening the motor circuit when the circuit controller is closed.

9. In combination, a sectionalized transmission line, circuit controllers for connecting adjacent sections of said transmission line, a motor for each circuit controller, an energizing circuit for each motor, mechanism for each circuit controller for closing the circuit controller after a definite period of time after the motor circuit is energized and for opening the motor circuit when the closing movement of the circuit controller is completed, an electromagnet for each circuit controller for holding the circuit controller after the closing movement is complete, and a circuit for each electromagnet energized from the adjacent section of the transmission line nearer to the generating station.

10. A sectionalized line for transmitting electrical energy and distributing it to apparatus which consumes more current when energy is first applied than after energy has been applied for a period of time, a generator for the line the capacity of which is substantially the same as the normal energy required for the operation of said apparatus, circuit controllers for connecting adjacent sections of said line, and slow acting means for each circuit controller for closing said controller, said means receiving energy from the adjacent section nearer to the generator, the time required for the operation of each said means being such that the energy drawn from the generator when the line is being energized does not exceed the overload capacity of the generator.

11. In combination, a sectionalized transmission line, and slow-acting means for connecting adjacent sections of said line together upon the lapse of a predetermined time interval after potential has been applied to one of said sections.

12. In combination, a sectionalized transmission line, a generator for supplying electrical energy thereto, and slow-acting means for connecting adjacent sections of said line together upon the lapse of a predetermined time interval after potential has been applied to the section nearer the generator.

13. In combination, a sectionalized transmission line, a source of current at one end of the line, the line being so arranged that as each two adjacent sections are connected together the section farther from the source receives current from the source through the section nearer the source, and slow-acting means at the junction of each two adjacent sections for connecting said sections together upon the lapse of a predetermined time interval after potential has been applied to the section nearer the source.

In testimony whereof I affix my signature in presence of two witnesses.

JOHN S. HOLLIDAY.

Witnesses:
HARRY OAKES,
A. C. NOLTE.